(12) United States Patent
Parker

(10) Patent No.: US 8,328,280 B2
(45) Date of Patent: Dec. 11, 2012

(54) HINGED CENTER BOLSTER FOR CENTER ISO FIX ATTACHMENT IN A HIGH BOLSTER REAR SEAT

(75) Inventor: Grey B. Parker, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 146 days.

(21) Appl. No.: 12/873,844

(22) Filed: Sep. 1, 2010

(65) Prior Publication Data

US 2012/0049590 A1  Mar. 1, 2012

(51) Int. Cl.
*A47C 1/11* (2006.01)
(52) U.S. Cl. .................. 297/253; 297/236; 297/256.16
(58) Field of Classification Search .............. 297/236, 297/238, 253, 113, 115, 117, 256.16
See application file for complete search history.

(56) References Cited

U.S. PATENT DOCUMENTS

| 4,756,573 | A | 7/1988 | Simin et al. |
|---|---|---|---|
| 5,121,964 | A | 6/1992 | Fourrey et al. |
| 6,254,183 | B1 | 7/2001 | Bian et al. |
| 6,264,261 | B1 | 7/2001 | Krafcik |
| 6,494,531 | B1 | 12/2002 | Kim |
| 7,281,763 | B1 | 10/2007 | Hayashi et al. |
| 7,427,103 | B2 | 9/2008 | Weber |
| 2008/0238162 | A1 | 10/2008 | Suzuki et al. |

*Primary Examiner* — Anthony D Barfield
(74) *Attorney, Agent, or Firm* — Rankin Hill & Clark LLP

(57) ABSTRACT

A vehicle seat assembly includes a pair of outboard seats and a stationary center bolster positioned between the outboard seats. Each of the outboard seats has a seatback and a seat base. The center bolster includes a cushion and a back. The cushion has a hinged portion which is movable to reveal a pair of low mount anchor bars associated with the center bolster for securing an associated child restraint to the center bolster. The hinged portion is movable from a stowed position to a support position. In the support position, the hinged portion is configured to at least partially support the associated child restraint.

13 Claims, 6 Drawing Sheets

HINGED CENTER BOLSTER FOR CENTER ISO FIX ATTACHMENT IN A HIGH BOLSTER REAR SEAT

BACKGROUND

Exemplary embodiments herein generally relate to a vehicle seat assembly, and more particularly to a center bolster having a hinged portion for a center ISO-FIX attachment of an associated child restraint.

A known vehicle seat assembly includes a pair of outboard seats, each outboard seat having a seatback connected to a seat base or cushion. The seatback of each outboard seat can be moved between an upright, seated position and a folded, stowed position. A stationary center bolster or cushion can be provided between the outboard seats. Typically, a mid-row seating assembly for a vehicle with an aggressive center bolster styling has complex close-out designs for the center ISO-FIX (i.e., the international standard for attachment points for child safety restraints, such as child safety seats or booster seats, in vehicles) attachment of a child restraint to the center bolster. Particularly, as shown in FIG. 9, a center bolster 100 for a mid-row seating assembly includes a seat base or cushion 102 and a seatback 104. Center anchorages or anchor bars 110 are provided for mounting a child safety restraint 112 to the center bolster 100. The child restraint includes side tethers 120 for releasably engaging the anchor bars 110 and a top tether 122 for releasably engaging a top tether anchorage (not shown) provided on the seatback 104 or elsewhere on the vehicle. In the known mid-row seating assembly, it is necessary to mount the center anchor bars 110 on the seat back 104 instead of a support component where the lower anchorages for the outboard seats are mounted. In the secured position, a forward portion of the child restraint 112 is located above the center bolster 110 which can cause the child restraint to at least partially rock or move on the center bolster. Further, the center anchor bars 110 must remain above the seat cushion 102 which may require the anchor bars to be mounted to the seatback 104. This will require reinforcement adding cost and weight to the seatback. Thus, the center ISO-FIX attachment demonstrates many challenges both to seat design and to trim cover/close-out design. For this reason, many vehicle manufacturers remove the center ISO-FIX attachment entirely. If the center ISO-FIX attachment is included in the seat assembly, expensive plastic garnishes, trim cover slits, or flaps are commonly used as close-out designs to conceal the center anchor bars.

BRIEF DESCRIPTION

In accordance with one aspect, a vehicle seat assembly comprises a pair of outboard seats and a stationary center bolster positioned between the outboard seats. Each of the outboard seats has a seatback and a seat base. The center bolster includes a cushion and a back. The cushion has a hinged portion which is movable to reveal a pair of low mount anchor bars associated with the center bolster for securing an associated child restraint to the center bolster. The hinged portion is movable from a stowed position to a support position. In the support position, the hinged portion is configured to at least partially support the associated child restraint.

In accordance with another aspect, a vehicle seat assembly comprises a pair of outboard seats and a center bolster positioned between the outboard seats. Each of the outboard seats has a seatback and a seat base. The center bolster includes a cushion and a back. The cushion has a first cushion member and a second cushion member mounted atop the first cushion member. The second cushion member is movably connected to the first cushion member to reveal anchor bars associated with the center bolster for securing an associated child restraint to the center bolster. The second cushion member is configured to hide the anchor bars thereby eliminating a need for separate close-out devices for the center bolster for concealing the anchor bars.

In accordance with yet another aspect, a vehicle seat assembly comprises a pair of outboard seats and a stationary center bolster positioned between the outboard seats. Each of the outboard seats has a seatback and a seat base. The center bolster includes a cushion and a back. The cushion has a stationary first cushion member and a second cushion member mounted to the first cushion member. The second cushion member is movable relative to the first cushion member to one of an upright position and a generally horizontal position to reveal anchor bars associated with the center bolster for securing an associated child restraint to the center bolster. The second cushion member at least partially supports the associated child restraint in the generally horizontal position to maintain a proper installation angle for the child restraint.

DETAILED DESCRIPTION

It should, of course, be understood that the description and drawings herein are merely illustrative and that various modifications and changes can be made in the structures disclosed without departing from the present disclosure. It will also be appreciated that the various identified components of the exemplary vehicle seat assembly disclosed herein are merely terms of art that may vary from one manufacturer to another and should not be deemed to limit the present disclosure.

Figure 1:
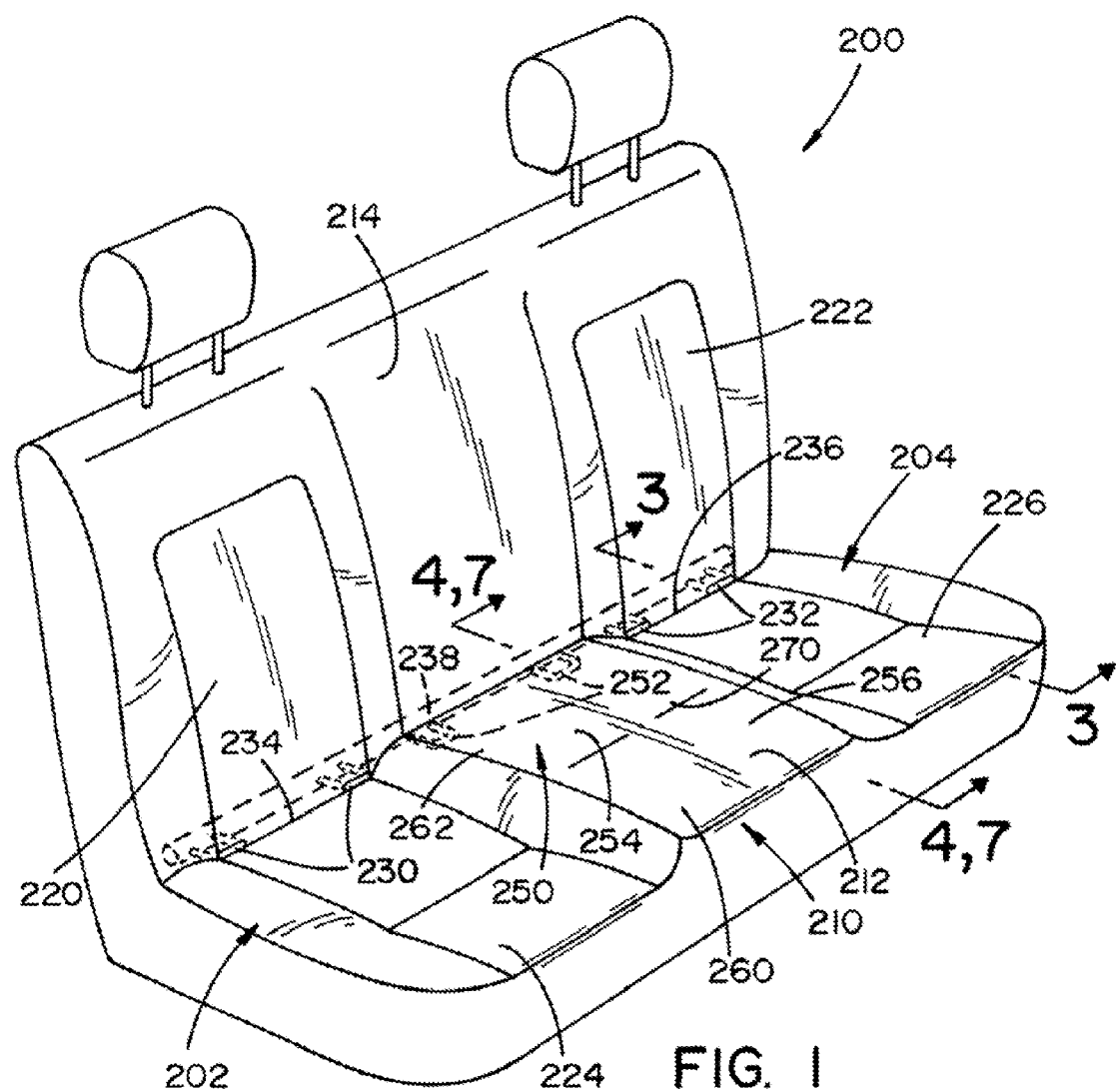
FIG. 1 is a perspective schematic of an exemplary vehicle seat assembly including a pair of outboard seats and a center bolster, the center bolster having a hinged portion for a center ISO-FIX attachment of an associated child restraint, the hinged portion of the center bolster being in a stowed position.
Figure 2:
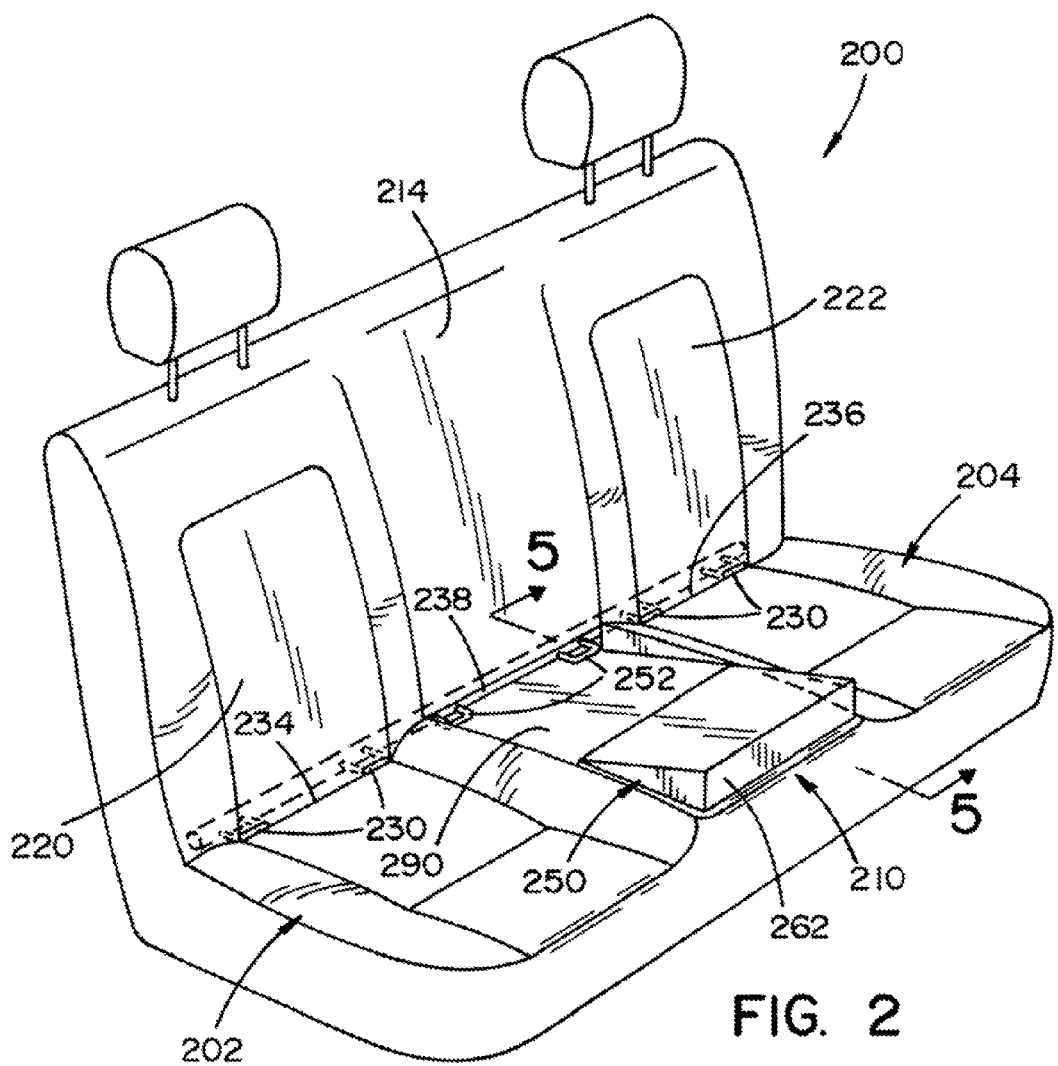
FIG. 2 is a perspective schematic of the exemplary vehicle seat assembly of FIG. 1, the hinged portion of the center bolster being in a support position.
Figure 3:
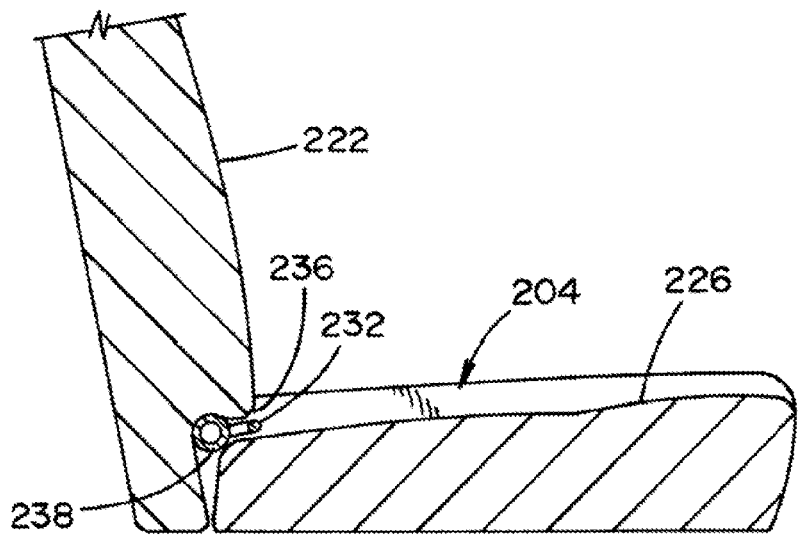
FIG. 3 is a schematic cross-sectional view of one of the outboard seats of FIG. 1 taken generally along line 3-3 of FIG. 1.

Referring now to the drawings, wherein like numerals refer to like parts throughout the several views, FIGS. 1 and 2 illustrate an exemplary vehicle seat assembly 200 according to the present disclosure, which can be provided as a vehicle mid-row seat assembly. The seat assembly 200 includes a pair or outboard seats 202,204 and a stationary center bolster or cushion 210 provided between the outboard seats. The center bolster 210 includes a base or cushion 212 and a back 214 connected to the cushion. Each outboard seat 202,204 has a respective seatback 220,222 connected to a seat base or cushion 224,226. The seatback of each outboard seat can be moved between an upright, seated position where the seatback is generally perpendicular to the seat base and a folded, stowed position where the seatback rests upon the seat base. It should also be appreciated that the back 214 of the center bolster 210 can move between an upright position and a stowed position together with one of the seatbacks 220,222 and/or separately from the seatbacks 220,222.

Each of the outboard seats 202, 204 include a pair of outboard anchorages or anchor bars 230, 232 for securing an associated child safety restraint (i.e., child safety seats or booster seats) (not shown) to one of the outboard seats. As shown, the anchor bars 230, 232 of each of the outboard seats are positioned below a seat bight 234, 236 of each of the outboard seats which allows the anchor bars 230, 232 to be fixed to a common associated support component 238. As is well known, the seat bights are the intersection of the seatbacks 220,222 and bottom seat cushions 224,226 of the respective outboard seats 202,204, where safety belts frequently emerge and where or near where the lower anchorages 230,232 for the respective outboard seat are placed. The support component 238 can be secured to the vehicle body (not shown) in a known manner.

Figure 6:
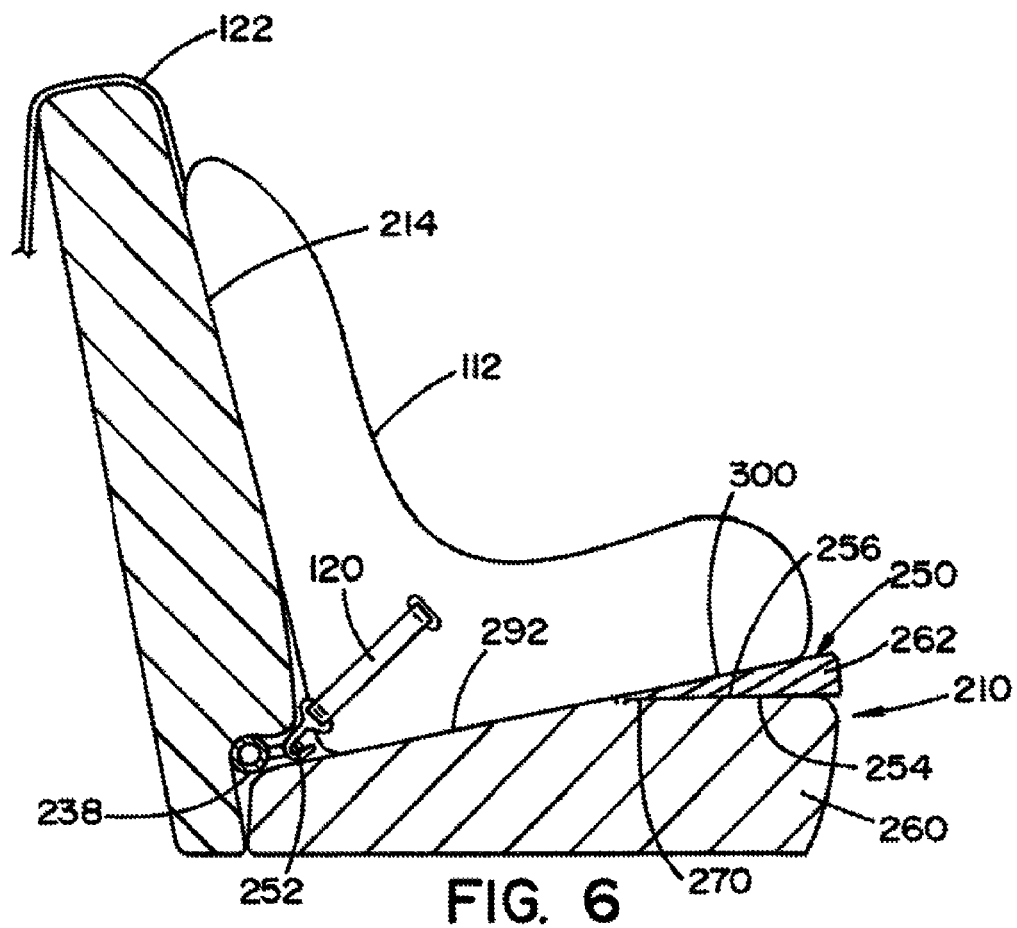
FIG. 6 is a schematic view of the center bolster of FIG. 5 having an associated child restraint mounted thereto, the hinged portion at least partially supporting a base of the child restraint.
Figure 8:
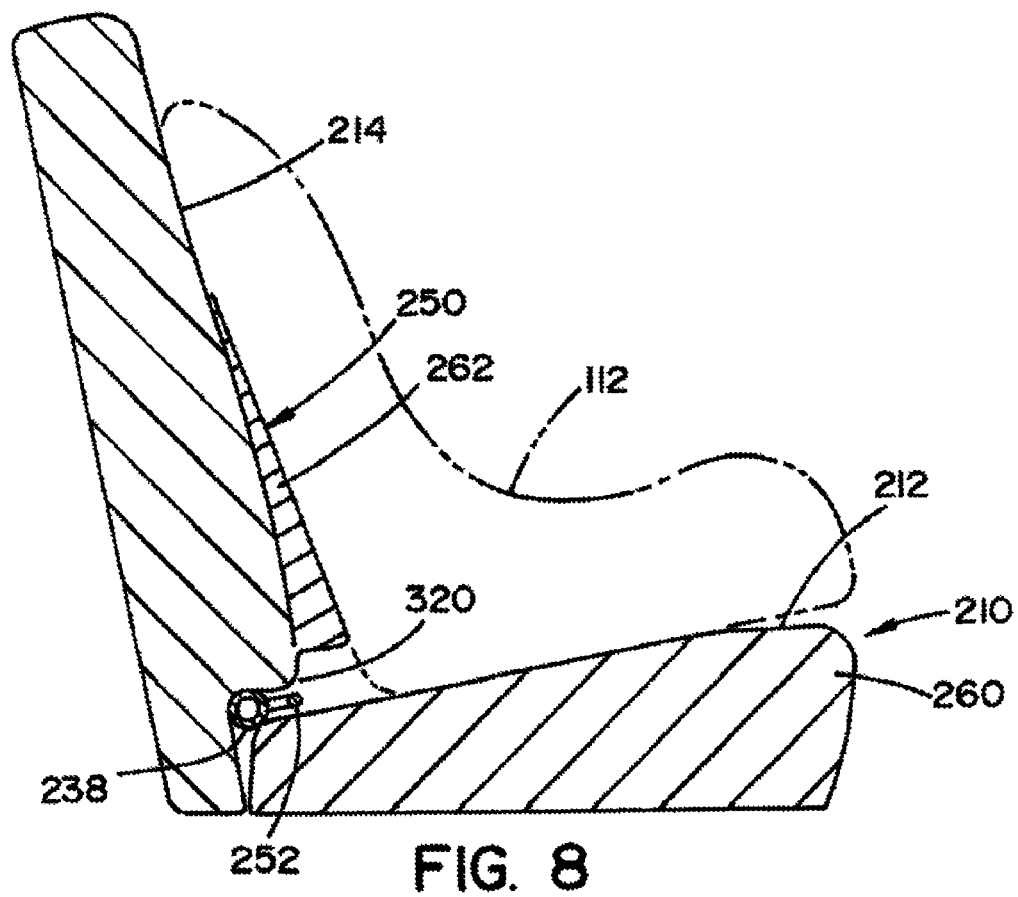
FIG. 8 is a schematic view of the center bolster of FIG. 7, the hinged portion being in a support position, the center bolster having an associated child restraint mounted thereto, the hinged portion at least partially supporting a back of the child restraint.
Figure 9:
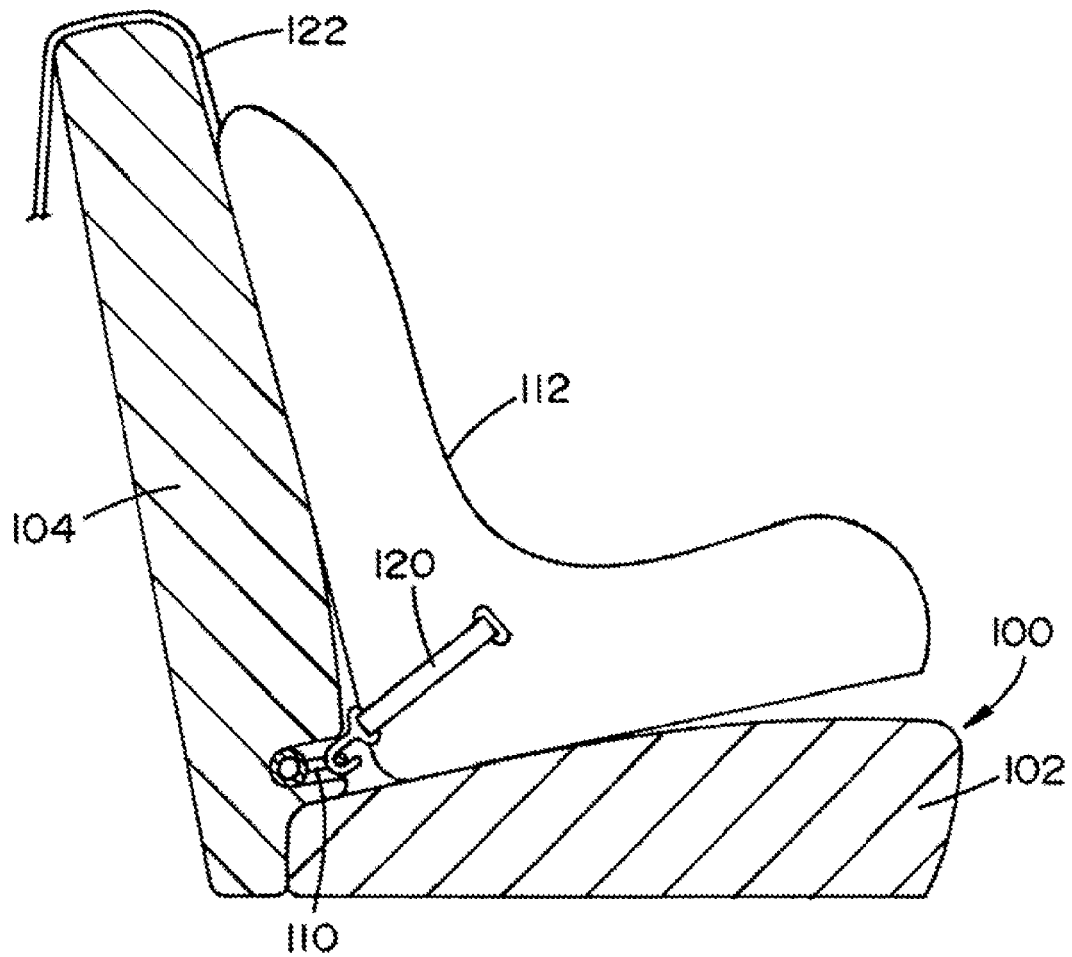
FIG. 9 is a side schematic view of a known center bolster having a child restraint secured thereto for a vehicle seat assembly.

The cushion 212 of the center bolster 210 has a hinged portion 250 which is moveable to reveal a pair of low mount anchor bars 252 associated with the center bolster 210 for securing a child restraint 112 (FIG. 9) to the center bolster. The hinged portion 250 is moveable from a stowed position (FIG. 1) to a support position (FIG. 6 and FIG. 8). In the stowed position, a top surface 254 of the hinged portion 250 is contiguous with a top surface 256 of the remainder of the cushion 212 which maintains the overall aesthetic appearance of the center bolster 210. In the support position, the hinged portion 250 is configured to at least partially support one of a back and a base of the associated child restraint 112. More particularly the center bolster 210 includes a first cushion member 260 and a second cushion member 262 positioned on and hingedly mounted to the first cushion member. The second cushion member 262 is movable relative to the first cushion member 260 to one of an upright position and a generally horizontal position to reveal the anchor bars 252 associated with the center bolster 210 for securing the associated child restraint 112 to the center bolster 210. The second cushion member 262 is generally wedge-shaped or generally triangular shaped in cross-section taken parallel to the direction of travel for the vehicle for at least partially supporting the associated child restraint 112 on the center bolster 210.

Figure 5:
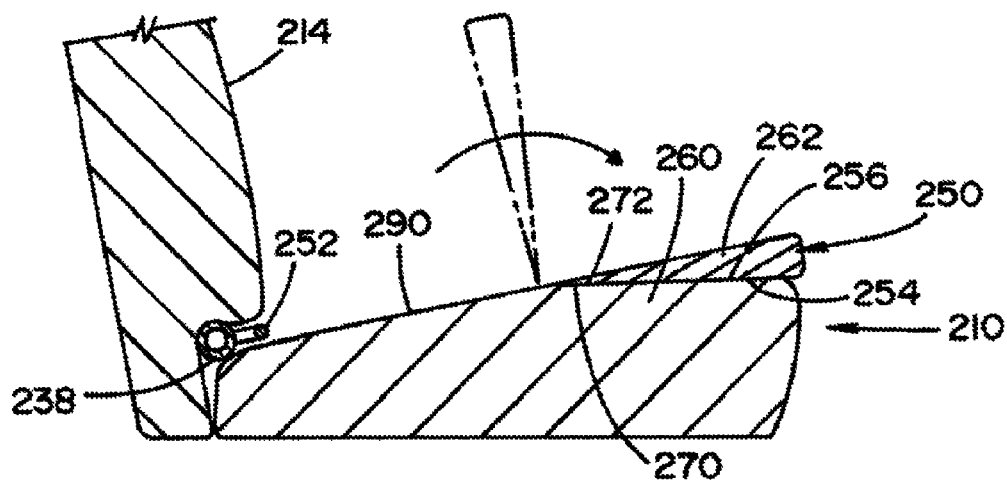
FIG. 5 is a schematic cross-sectional view of the center bolster of FIG. 2 taken generally along line 5-5 of FIG. 2.

According to one exemplary aspect, and as shown in FIGS. 2, 5 and 6, a forward portion 270 of the second cushion member 262 is hingedly mounted to a forward portion 272 of the first cushion member 260. This allows the second cushion member 262 to pivot towards the forward portion 272 of the first cushion member 260 as the second cushion member is moved from the stowed position to the support position. To receive the second cushion member 262 in the stowed position, the first cushion member 260 defines a downwardly slopped portion 290 which receives the second cushion member 262 in the stowed position. As stated above, in the stowed position, the top surface 254 of the second cushion member 262 is contiguous of the top surface 256 of the first cushion member 260. The top surfaces 254,256 can be separate surfaces for the cushion 212, or, in the depicted exemplary embodiment, the top surfaces 270,272 can form a unitary or common top surface 280 for the cushion 212. It should be appreciated that the common top surface 280 can eliminate a split line from being formed between the first and second cushion members 260,262 on the cushion 212, and can prevent the feeling of being seated on separate cushions for a center occupant.

Figure 4A:
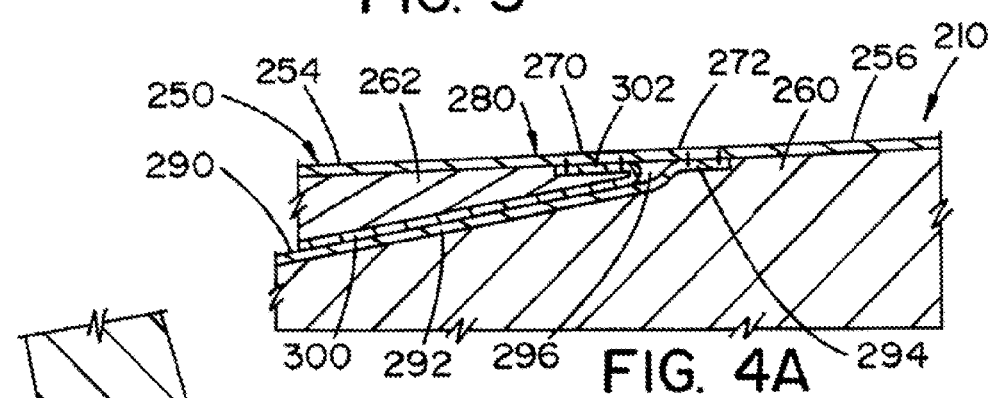
FIG. 4A is an enlarged view of an exemplary connection of the hinged portion of FIG. 4.
Figure 4:
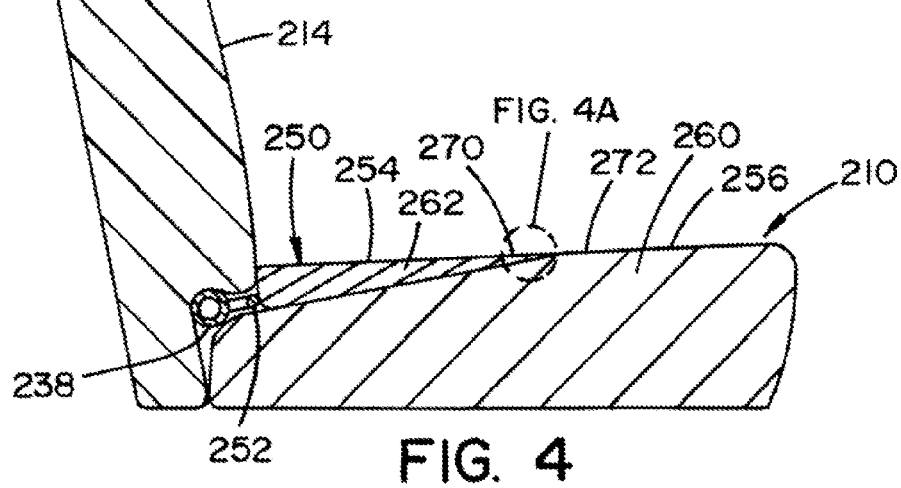
FIG. 4 is a schematic cross-sectional view of one exemplary aspect of the center bolster of FIG. 1 taken generally along line 4-4 of FIG. 1.

FIGS. 4 and 4a depict one exemplary manner of hingedly mounting the forward portion 270 of the second cushion member 262 to the forward portion 272 of the first cushion member 260. As shown, the slopped portion 290 of the first cushion member 260 has a top surface 292 having a forward end 294 which is secured to the top surface 256 of the first cushion member 260. For top surfaces formed of a fabric material or layer, forward end 294 of top surface 292 can be stitched to top surface 256. For top surfaces formed from a leather material or layer, forward end of top surface 292 can be adhesively bonded or stitched to top surface 256. Once the forward end 294 is secured to the top surface of the first cushion member 260, an offset region 296 is provided which prevents the forward portion 270 of the second cushion member from projecting at least partially outwardly from the cushion 212. The second cushion member 262 includes a bottom surface 300 having a forward end 302 is secured to the top surface 280 in a manner similar to top surface 292. The engagement of the bottom surface 300 to the top surface 280 defines a hinge which allows the second cushion member 262 to pivot on the first cushion member 260 from the stowed position shown in FIG. 4 to a support position shown in FIG. 5. Although, it should be appreciated that alternative manners for hingedly connecting the second cushion member 262 to the first cushion member 260 are contemplated. For example, a frame (not shown) of the seat assembly 200 can be provided with a support member which extends laterally across the center bolster 210 beneath the forward portion 270 of the second cushion member 262. The second cushion member 262 can then be rotatably secured to the support member.

As indicated previously the hinged portion 250 of the center bolster 210 is configured to at least partially support the associated child seat 112 on the center bolster. As shown in FIGS. 5 and 6, the second cushion member 262 can be pivoted about its forward portion 270 such that the top surface 254 of the second cushion member 262 generally rests upon or at least partially abuts the top surface 256 of the first cushion member 260. The associated child seat 112 can then be secured to the center bolster 210 in a conventional manner. Particularly, the side tethers 120 releasably engage the anchor bars 252 and the top tether 122 releasably engages a top tether anchorage (not shown), which can be provided on the back 214 of the center bolster 210 or elsewhere in the vehicle. As shown in FIG. 6, in the support position, the second cushion member 262 is provided at a forward portion of the center bolster 210, top surface 292 being generally coplanar with bottom surface 300. The second cushion member 262 is generally triangular shaped in cross-section such that the second cushion member 262 forms a wedge between a base of the child restraint 112 and the first cushion member 260. This prevents any rocking of the child restraint 112 on the center bolster 210. Further, the second cushion member 262 is wedged between the base of the child restraint 112 and the first cushion member 260, a proper installation angle for the child restraint is maintained, thereby allowing for proper installation of the child restraint 112 to the seat assembly 200.

With reference again to FIG. 1, and as indicated previously, each of the outboard seats 202, 204 include the pair of outboard anchor bars 230, 232 for securing another child restraint to one of the outboard seats. By providing the moveable second cushion member 262, the anchor bars 252 of the center bolster 210 can also be located below the seat bights 234, 236 of the outboard seats. This allows the anchor bars 252 to be mounted to the same support component 238 as the anchor bars 230, 232 of the respective outboard seats 202, 204. In contrast to the known seat assembly shown in FIG. 9, the second cushion member 262 is configured to hide the anchor bars 252. This eliminates the need for separate close-out devices for the center bolster 210 for concealing the anchor bars. The anchor bars 252 are anchored on the common support component 238 and are not provided on the back 214 of the center bolster 210.

Figure 7:
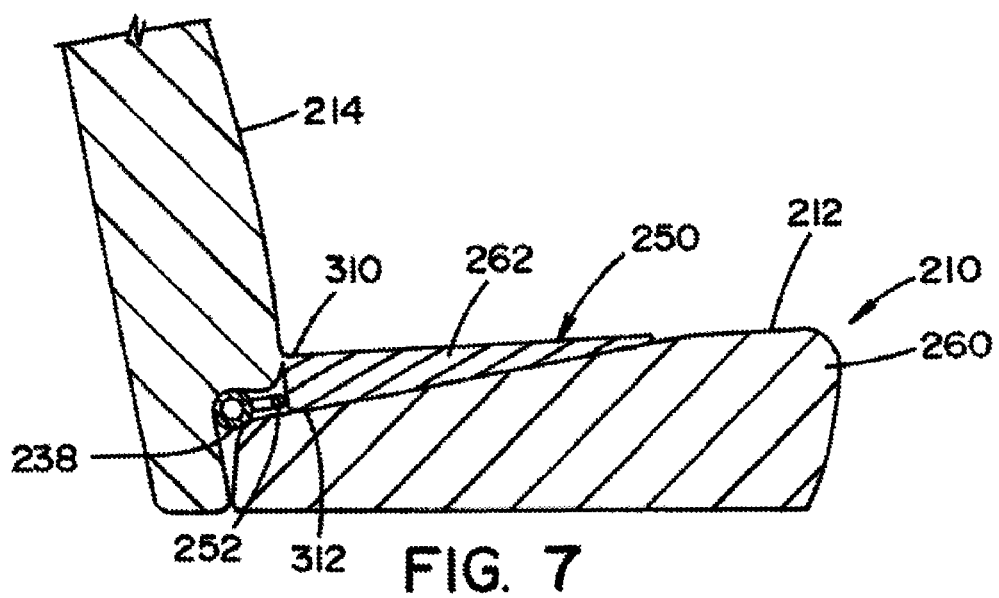
FIG. 7 is a schematic cross-sectional view of another exemplary aspect of the center bolster of FIG. 1 taken generally along line 7-7 of FIG. 1.

With reference to FIGS. 7 and 8, according to another exemplary aspect, a rear portion 310 of the second cushion member 262 is hingedly mounted to one of the back 214 and a rear portion 312 of the first cushion member 260 in a manner similar to the manner described above. The second cushion member 262 is moveable to an upright position which is generally perpendicular to the first cushion member 260. In the upright position, the triangular shaped second cushion member 262 at least partially supports a back of the associated child restraint 112 secured to the center bolster 210. In the depicted exemplary embodiment, the back 214 and cushion 212 of the center bolster 210 define a split line 320 which extends laterally across the rear portion 312 of the first cushion member 260. The rear portion 310 of the second cushion member is hingedly mounted adjacent to split line which allows the second cushion member 262 to conform to both the back 214 and the back of the child restraint 112.

As is evident from the foregoing, by applying a hinge center portion 250 of the center bolster 210, aggressive styling can be applied and the anchor bars 252 can be mounted on the same support component 238 as the anchor bars 230, 232 of the respective outboard seats to 202, 204. The hinge portion 250 conceals the anchor bars 252 which eliminates the need for separate close out methods. When the hinge portion 250 is moved to the support position, the anchor bars 252 are highly visible and intuitive to the operator. Low installation forces for the associated child restraint 112 can be maintained. Also, the second cushion member 262 can serve as a lower support for the child restraint 112 to maintain a proper installation angle for the child restraint.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A vehicle seat assembly comprising:
a pair of outboard seats, each of the outboard seats having a seatback and a seat base; and
a stationary center bolster positioned between the outboard seats, the center bolster having a cushion and a back, the cushion having a first cushion member and a second cushion member positioned on and moveable relative to the first cushion member to reveal a pair of low mount anchor bars associated with the center bolster for securing an associated child restraint to the center bolster, the second cushion member being movable from a stowed position to a support position, wherein a forward portion of the second cushion member is hingedly mounted to a forward portion of the first cushion member, wherein in the support position, a top surface of the second cushion member generally rests upon a top surface of the first cushion member to at least partially support the associated child restraint secured on the center bolster.

2. The vehicle seat assembly of claim 1, wherein in the support position, a bottom surface of the second cushion member is generally coplanar with a top surface of a rear portion of the first cushion member.

3. The vehicle seat assembly of claim 1, wherein each of the outboard seats includes a pair of outboard anchor bars for securing another associated child restraint to one of the outboard seats, the anchor bars of the center bolster being mounted to the same associated support component as the outboard anchor bars of the outboard seats.

4. A vehicle seat assembly comprising:
a pair of outboard seats, each of the outboard seats having a seatback and a seat base; and
a center bolster positioned between the outboard seats, the center bolster includes a seat base and a seatback, the seat base having a first cushion member and a second cushion member permanently mounted atop the first cushion member, the second cushion member being moveable relative to the first cushion member to reveal anchor bars associated with the center bolster for securing an associated child restraint to the center bolster.

5. The vehicle seat assembly of claim 4, wherein the second cushion member is movable to an upright position which is generally perpendicular to a rear portion of the first cushion member.

6. The vehicle seat assembly of claim 4, wherein the second cushion member includes a top surface, the second cushion member being movable to a generally horizontal, support position where the top surface at least partially abuts a top surface of the first cushion member.

7. The vehicle seat assembly of claim 6, wherein in the support position, the second cushion member at least partially supports a base of the associated child restraint secured on the center bolster to maintain a proper installation angle for the child restraint.

8. The vehicle seat assembly of claim 7, wherein the second cushion member is generally triangular shaped in cross-section allowing the second cushion member to at least partially support the associated child restraint secured on the center bolster.

9. The vehicle seat assembly of claim 4, wherein each of the outboard seats includes a pair of outboard anchor bars for securing another associated child restraint to one of the outboard seats, the anchor bars of each of the outboard seats and the center bolster being positioned below a seat bight of each of the outboard seats allowing the anchor bars of the center bolster to be fixed to the same associated support component as the outboard anchor bars of the outboard seats.

10. A vehicle seat assembly comprising:
a pair of outboard seats, each of the outboard seats having a seatback and a seat base; and
a center bolster positioned between the outboard seats, the center bolster having a stationary first cushion member and a second cushion member mounted to the first cushion member, the second cushion member being movable relative to the first cushion member to one of an upright position and a generally horizontal position to reveal anchor bars associated with the center bolster for securing an associated child restraint to the center bolster, the second cushion member at least partially supporting the associated child restraint in the generally horizontal position to maintain a proper installation angle for the child restraint, wherein in the generally horizontal position, the second cushion member is positioned between a base of the associated child restraint and the first cushion member and a bottom surface of the second cushion member is generally coplanar with a top surface of the first cushion member.

11. The vehicle seat assembly of claim 10, wherein each of the outboard seats includes a pair of outboard anchor bars for securing another associated child restraint to one of the outboard seats, the anchor bars of each of the outboard seats and the center bolster being positioned below a seat bight of each of the outboard seats.

12. The vehicle seat assembly of claim 11, wherein the anchor bars of the center bolster are fixed to the same associated support component as the outboard anchor bars of the outboard seats.

13. The vehicle seat assembly of claim 10, wherein in the upright position, the second cushion member at least partially supports a back of the associated child restraint.

* * * * *